(No Model.) 2 Sheets—Sheet 2.
C. F. WINKLER.
ELECTRIC MOTOR.
No. 510,662. Patented Dec. 12, 1893.
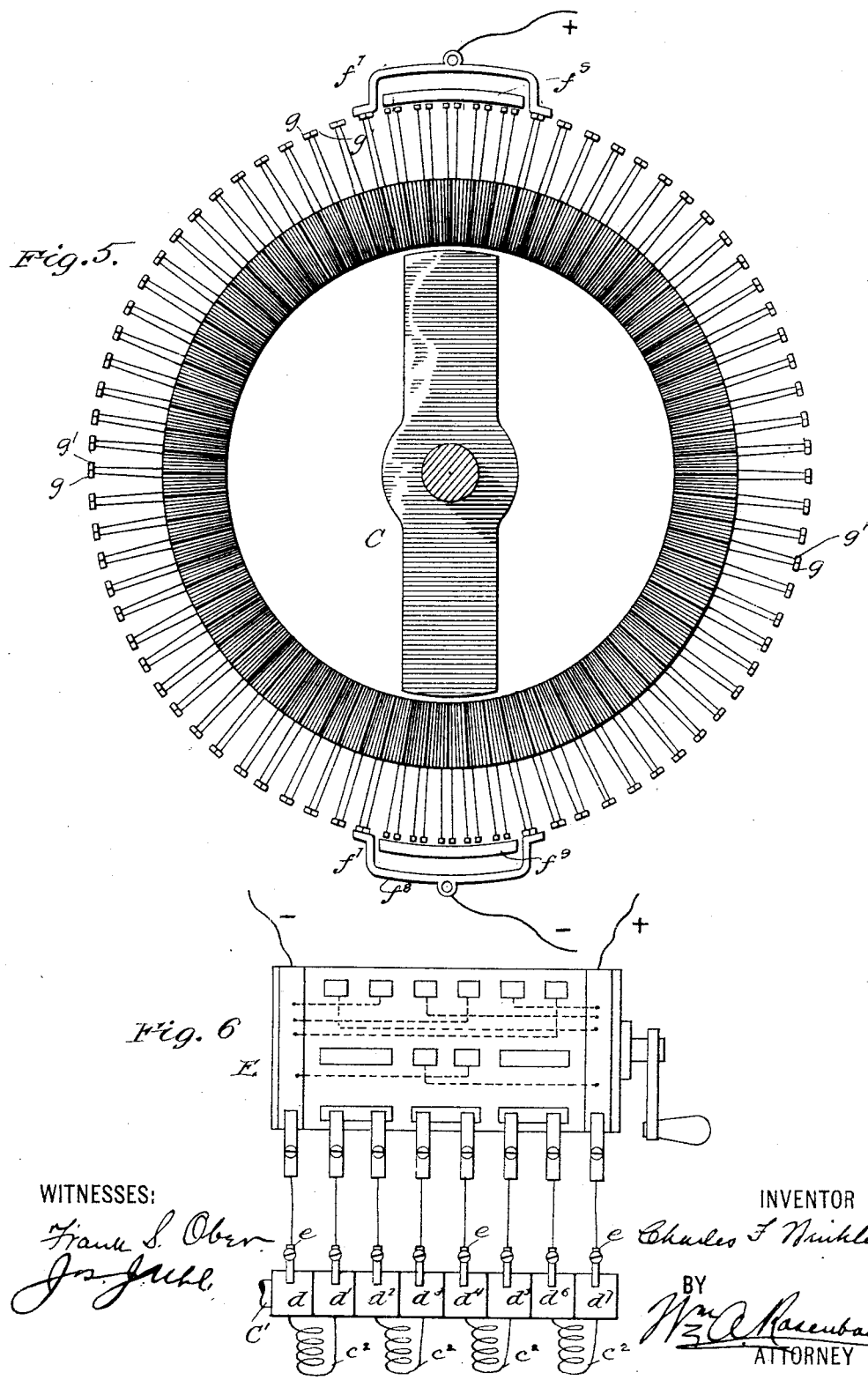
WITNESSES:
INVENTOR

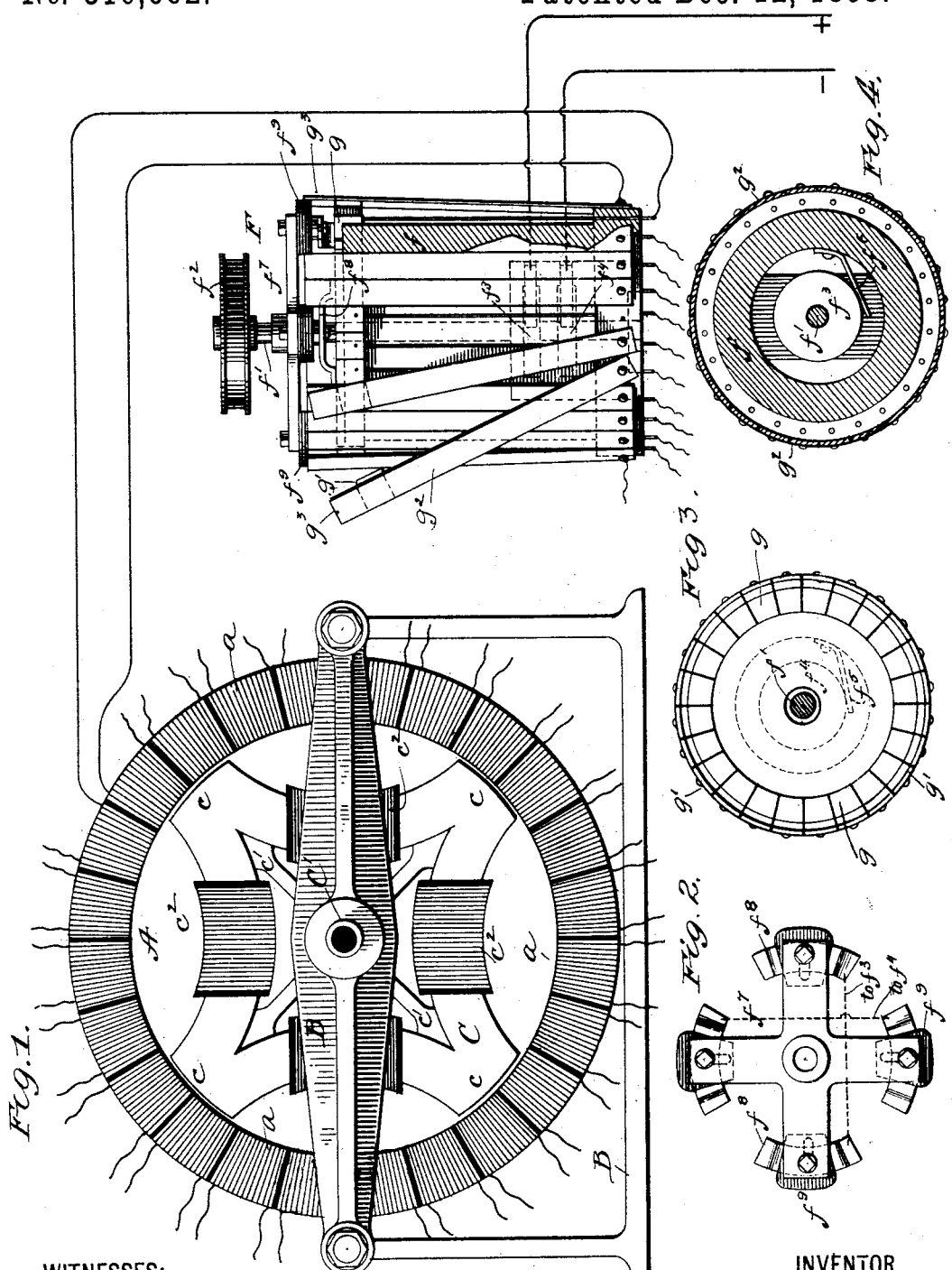

UNITED STATES PATENT OFFICE.

CHARLES F. WINKLER, OF TROY, NEW YORK.

ELECTRIC MOTOR.

SPECIFICATION forming part of Letters Patent No. 510,662, dated December 12, 1893.

Application filed December 24, 1892. Serial No. 456,235. (No model.)

*To all whom it may concern:*

Be it known that I, CHARLES F. WINKLER, a citizen of the United States, residing at Troy, in the county of Rensselaer and State of New York, have invented certain new and useful Improvements in Electric Motors, of which the following is a full, clear and exact description.

My invention relates to electric motors, the objects being, first, to produce a motor which ordinarily produces no counter electro-motive-force, but which may, at the will of the operator, be made to generate counter electro-motive force when the conditions require it; second, to produce a motor which does not depend upon counter-electro-motive force to protect its windings from injury ordinarily caused by excessive currents; third, to produce a motor which will perform its maximum work at a very slow speed; fourth, to produce a motor in which the commutator is free from the ordinary objectionable features of this apparatus.

In the machine which I have invented the body carries pole pieces which are caused to move by the shifting polarity in a ring magnet. The polarity is established in the magnet by the main current flowing in coils of wire on the magnet. These coils are all normally connected in a closed series, but means are provided for opening the circuit of the coils as they are passed or cut by the lines of force passing to and from the rotating body thus preventing the generation or induction of an electro-motive force therein. At the same time the construction is such that the main supply or motive current is not interrupted, but has a free circuit through the coils of the ring and is always acting uniformly to produce a polarity in the ring.

The invention will be described in detail with reference to the accompanying drawings, in which—

Figure 1 is a conventional view of the apparatus and circuits. Fig. 2 is a plan of the brushes and brush holder. Figs. 3 and 4 are respectively a top and bottom view of the commutator. Fig. 5 is a diagrammatical view of portions of the apparatus to illustrate the operation; and Fig. 6 is a detail of a controlling apparatus.

Referring to the drawings by letter, A represents an electro-magnet in the form of a ring; it is wound with a comparatively large number of coils $a$. This ring is supported stationary in the frame B. Inside of the ring is mounted a rotary body of iron $c$, fixed upon shaft $C'$ which has its bearings in the frame B. As shown in Fig. 1, this body has four pole pieces $c, c, c, c$, which are located at the corners of a substantially rectangular open body or core which is supported upon the shaft by a spider $c'$. I prefer to place upon each arm or side of the rectangular core, a coil of wire $c^2$ through which current will pass in such directions as will produce magnetic poles alternating in sign around the four corners of the rectangle.

Upon the shaft $C'$ I place a series of metallic rings $d, d', d^2$, &c., insulated from each other and from the shaft and connect the beginnings and endings of the four coils $c^2$ respectively to them, either by wires running through the hollow shaft or in any other desirable manner. This is shown in Fig. 6. Upon each ring one end of a brush $e$ bears, and the other ends of the brushes are connected with brushes which bear upon the surface of a cylinder switch E which contains rows of metallic contact pieces in its surface adapted to be brought successively under the brushes to connect them and the coils $c^2$ together in various ways to alter the current flowing through them. For instance, in the position shown, the coils are connected in series; in the next position the two pairs of coils are connected in parallel, and in the next position the four coils are in parallel.

F represents what I shall call the commutator, although its function is not the same as the apparatus commonly known by that name. It may be located at any distance from the apparatus above described, and is, mechanically considered, entirely independent thereof. As illustrated, it consists of a cylinder $f$ of insulating material, through the axis of which a shaft $f'$ passes. One end of this shaft is fitted with a pulley $f^2$, crank or other device by which it may be rotated. The shaft also carries a pair of metallic disks $f^3, f^4$, insulated from each other and upon which bear respectively, two brushes $f^5, f^6$, to which the mains + and − are connected. Upon the shaft, near one end is also fixed a four armed brush holder $f^7$ which runs parallel to one of the heads of the cylinder. At the end of each arm is fixed a straddling brush $f^8$. By "straddling" I mean a brush which has two points of contact separated from each other so as to bridge a number of commutator segments, as will hereinafter appear. Each brush holder also carries a cam $f^9$ which occupies the space between the two contacts of the brush. The cams are provided with slots to be adjustable radially upon the holder so as to be thrown into and out of operative position. Upon the end of the cylinder adjacent to the brush holder is a circle $g$ of commutator segments upon which the brushes bear. These segments have angle extensions which overlap the edge of the cylinder and against these extensions another circle $g'$ of segments bear respectively. The segments or blocks $g'$ are carried respectively by spring strips $g^2$ which normally hold them in contact with segments $g'$, but which are adapted to be pushed outward radially by the cams $f^9$ impinging against extensions $g^3$ and thus severing the electrical connections between the pairs of commutator segments. The pairs of abutting segments $g, g'$ are connected with the adjacent ends of coils $a$ on the ring A in succession. That is, the end of one coil is connected through a pair of segments with the beginning of the next coil, and as these connections are made successively all around, the coils are connected in series. In Fig. 1 some of the spring strips are swung to one side to more clearly show the construction, while other parts are broken away for the same reason. Only two of the connecting wires between the commutator and the coils $a$ are shown in Fig. 1, but in Fig. 5 they are all shown.

The brushes $f^8$ are diametrically opposite each other and are electrically connected together. The pairs thus connected are respectively connected with disks $f^3$ and $f^4$.

Although a four pole machine is described, the same actions will take place in a two pole machine and for simplicity the description of the operation which follows has reference to a two pole machine illustrated in Fig. 5. There will be but two brushes and they will stand opposite each other on the commutator and connected respectively to the supply mains. Let us suppose that the cams are adjusted so that they will open the circuit between all those coils which the brushes bridge, as indicated. Then the current entering through the positive brush will divide and travel through the coils around each side of the ring and establish a polarity therein on a line through the brushes; the armature would then be attracted into this line. Now if the brushes are revolved, this polar line will shift or reverse in unison with the brushes and the armature will be accordingly attracted and will follow the brushes in accordance with a well known law. Now in any ordinary apparatus of this character the lines of force which pass through the armature, jump the air gap and cut the wires on the ring, would induce in said wires an electro-motive force opposing the electro-motive force on the line; but it will be observed that in this apparatus all those wires which are being cut by the lines of force passing through the armature are "open;" that is, the cams $f^9$ have disconnected them from the main circuit and no counter-electro-motive force can be induced. It is necessary, of course, that the brushes shall straddle all the coils which face the poles of the armature and that, at least, the terminals of the short series of coils which are straddled shall be disconnected from the coils in the main circuit.

In a machine of this character it will be observed that the speed is regulated by the speed of the brushes, it being understood, of course, that sufficient current is supplied to the field magnet to establish the necessary torque. In other words, current may be admitted to the field magnet in sufficient quantity to do the required duty without the opposition or resistance of counter-electro-motive force. This is admissible because the wire on the field magnet may be large enough to carry the required current without excessive heating.

It is intended to rotate the brushes by a small electric motor which may be regulated in accordance with the load on the main motor.

Having described my invention, I claim—

1. An electric motor consisting of a ring magnet wound with coils and a rotary armature inside of the same, in combination with a traveling switching apparatus arranged to send current through the coils and establish rotating consequent poles in the ring and means for opening the circuit of all the coils on the ring while they are faced by the armature.

2. An electric motor consisting of a ring magnet wound with coils connected together in series, a rotary armature inside of the ring in combination with a traveling switching apparatus adapted to direct current through the coils of the ring and consisting of brushes each of which straddle as many coils on the ring as are faced by one pole of the armature and sends the current around the ring in opposite directions from the legs of the straddling brushes and means for opening the circuit of all those coils on the ring included between the legs of the straddling brushes.

3. An electric motor consisting of a ring magnet wound with coils connected together in series by separable connections, a rotary armature inside of the ring, in combination with a switching device consisting of two rows of contact segments united together in pairs, each pair forming one of said separable connections between the coils on the ring, traveling brushes moving over said contacts, each brush constructed to straddle one or more pairs of segments and devices moving in unison with the brushes and adapted to separate the said pairs which the brushes straddle substantially as described.

4. In an electric motor, the combination with a ring magnet wound with coils in series with each other, of a commutating or switching device consisting of a series of normally closed circuit breakers located respectively between the coils on the ring magnet, a series of electrical contacts connecting respectively with the circuit between the coils, straddling brushes traveling over said contacts and devices moving in unison with the brushes and adapted to operate the circuit breakers occurring between all the coils straddled by the brushes substantially as described.

In testimony whereof I subscribe my signature in presence of two witnesses.

CHARLES F. WINKLER.

Witnesses:
WM. A. ROSENBAUM,
JOS. J. UHL.